May 23, 1972     D. V. ALLEN     3,664,583
VEHICLE TRACKWAY
Filed April 25, 1969
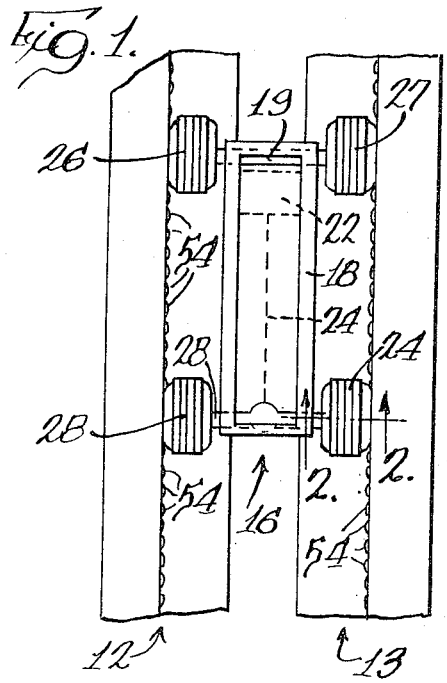
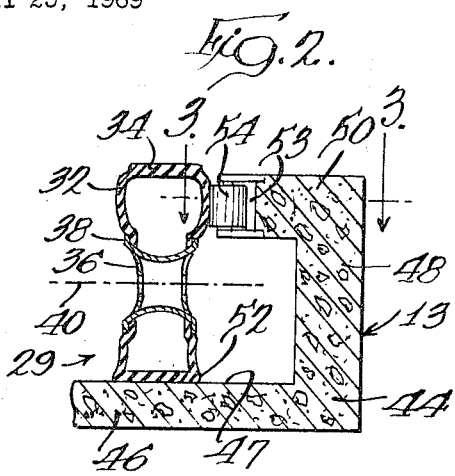
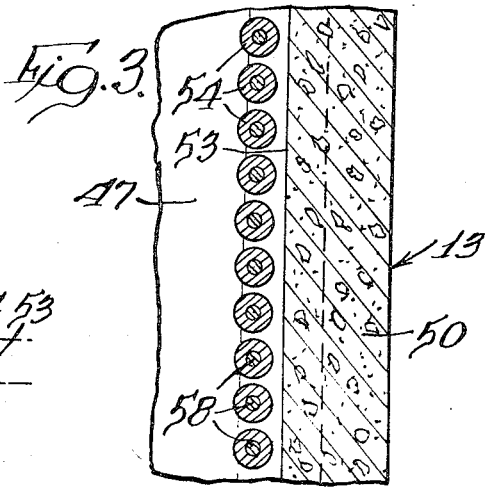
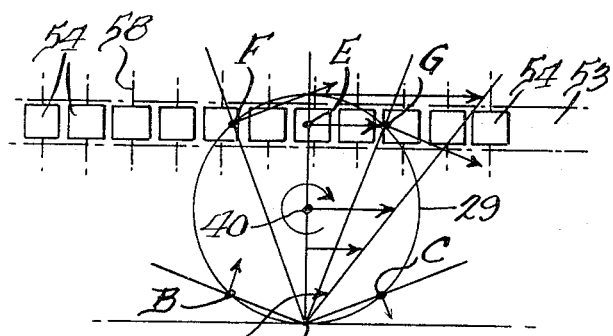
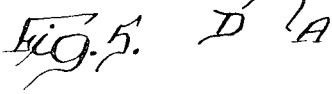
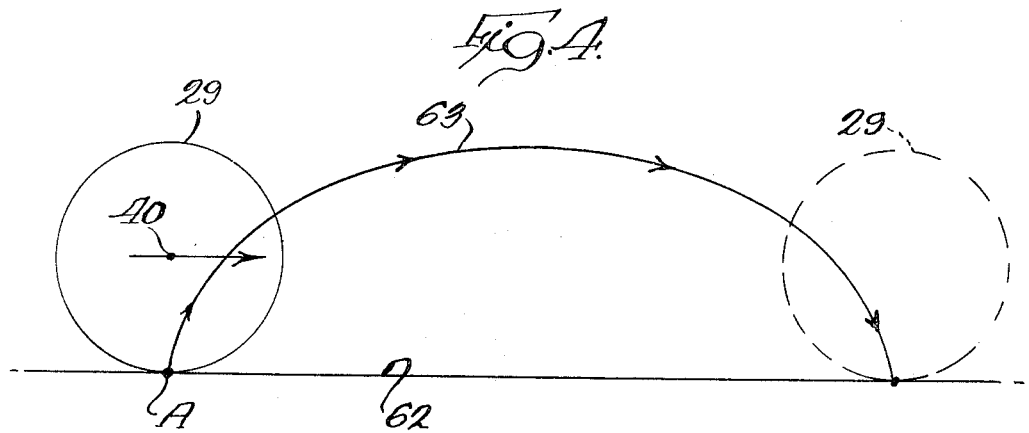

United States Patent Office 3,664,583
Patented May 23, 1972

3,664,583
VEHICLE TRACKWAY
Dillis V. Allen, 208 Euclid Ave.,
Arlington Heights, Ill. 60004
Filed Apr. 25, 1969, Ser. No. 819,211
Int. Cl. E01f 15/00
U.S. Cl. 238—5        3 Claims

ABSTRACT OF THE DISCLOSURE

A track for an inflatable rubber tired vehicle having a plurality of rollers mounted for rotation about a vertical axis and engageable with the rubber sides of the tires above the axis of rotation of the tires to reduce the axial and vertical friction between the tire and the track along the sides of the tire to a minimum.

BACKGROUND OF THE PRESENT INVENTION

With the modernization of expressway vehicular travel have come various proposals for guiding motor vehicles along the expressway. Various guidance systems for cars on expressways have been devised, many of these including different configurations of tracks for receiving the vehicle wheels and guiding the wheels along the expressway or roadway.

There are significant problems, however, in the provision of a track for an inflatable tired vehicle. The primary reason for this problem is that an inflatable tire is quite resilient and deformable and thus results in some instability when used with an unyielding track. Another problem with providing tracks for inflatable tired vehicles is that an inflatable tire flatens out and bulges when it engages the ground making it extremely difficult to design a track which would accommodate such configuration.

A still further problem in the provision of a trackway for engaging the sides of an inflatable tire is that the portions of the tire immediately adjacent the ground engaging portion thereof, i.e. the lower portion of the sides of the tire, have upward, horizontal and downward movement relative to the track and have an extremely high frictional coefficient with the track adapted to be engaged by the sides of the tire adjacent the ground engaging portion thereof.

SUMMARY OF THE PRESENT INVENTION

In accordance with the present invention the total frictional coefficient between an inflatable tired vehicle and a guiding track is substantially reduced by providing a track which has a plurality of rollers adapted for rotation about a vertical axis.

It can be kinematically demonstrated that the sides of the tire above the axis of rotation thereof have their major velocity components in the direction of movement of the vehicle or more generally in a horizontal direction. By positioning the side engaging portions of the track above the axis of rotation of the wheel, it is possible to take advantage of the substantially unidirectional velocity components of the tire in this area to provide a bearing surface on the track which will substantially reduce the resistance to forward motion of the vehicle through the rubber tires.

An additional advantage in this arrangement is that the track engages the side of the wheels at a portion thereof which is undeformed by the ground. As those familiar with inflatable vehicular tire deformation will appreciate, the bulge in the tire as it engages the ground is substantially eliminated as the previously bulged portion of the tire passes above its axis of rotation as the tire rotates. This permits the present tire engaging track to engage a substantially flat side wall of the tire increasing the area of contact between the tire and the track.

While the present inflatable tire track is particularly adaptable to present day motor vehicles with inflatable tires it will be understood that a limited modification of conventional bodies will be required to accommodate the track. However, this modification would be one virtually in appearance only and would not adversely affect either the cost or performance of the vehicle or automobile.

BRIEF DESCRIPTION OF THE DRAWING

FIG. 1 is a top elevation illustrating in schematic form the present vehicular tracks with a schematically illustrated motor vehicle riding therein;

FIG. 2 is a cross section taken generally along line 2—2 of FIG. 1 illustrating one tire and its relationship with the present track;

FIG. 3 is a fragmentary section taken generally along line 3—3 of FIG. 2;

FIG. 4 is a schematic diagram of the kinematic path of movement of one particle on the periphery of a rolling wheel; and FIG. 5 is a vector diagram of a wheel showing the direction of movement of various particles on the wheel with the track illustrated in fragmentary schematic form.

DETAILED DESCRIPTION OF THE PREFERRED EMBODIMENT

Referring to FIG. 1, the present trackway 10 is seen to include a pair of spaced tracks 12 and 13 which are identical in configuration, except oppositely disposed. A vehicle 16 is shown riding within the trackway and is a substantially conventional, inflatable tired automobile. The vehicle 16 includes a rectangular frame member 18 having a front axle 19 and a rear axle 20 supported therefrom. The prime mover 22 drive the rear axle 20 through a suitable drive shaft 24. Carried by the axles 19 and 20 are substantially conventional inflatable tires 26, 27, 28 and 29. Tires 26 and 28 are guided by track 12 while tires 27 and 29 are guided by track 13.

As may be seen more clearly in FIG. 3, tire 29, which is identical to tires 26, 27 and 28, is seen to have a generally annular reinforced rubber wall 32 with a substantially flat annular tread portion 34. Supporting the tire is a conventional wheel 36 having rims 38 which support the tire. Wheel 36 has an axis of rotation 40.

The track 13 consists of a generally U-shaped concrete ribbon 44 having a horizontally extending portion 46 defining horizontal surface 47, and upwardly extending portion 48 which carries a horizontally inwardly extending portion 50. The generally U-shaped configuration of concrete ribbon 44 permits the tire bulge indicated at 52 to freely enter the bight of the U without creating any side friction on the tire.

Mounted within a recess 53 extending longitudinally throughout the length of projecting portion 50 are a plurality of rollers 54 mounted for rotation within the recess 53 about substantially fixed vertical axes, or more specifically axes which are perpendicular to surface 47. The rollers 54 are preferably constructed of a material, such as polished steel that provides a low coefficient of friction with the rubber tire 29, or the sides thereof.

The location of the rollers 54 with respect to the tire 29 is a significant feature of the present invention. The rollers 54 are preferably located as far above the axis of rotation 40 of the wheel as will permit good contact between the rollers and the side wall of the tire. That is, there is obviously a location of the roller so high with respect to the tire that only a small portion of the roller will engage the side wall of the tire.

As may be seen in FIG. 3 the rollers 54 project from the recess 53 and are mounted for rotation about parallel axes 58.

As noted above, one of the important features of the present invention is that the rollers 54 are mounted to engage a portion of the tire 29 that has substantially unidirectional velocity components. Since the rollers 54 have unidirectional characteristics i.e. their least frictional resistance is in a tangential direction with respect to the rollers, the alignment of the unidirectional velocity components of the tire with the adjacent rollers 54 minimizes the frictional resistance against forward vehicular movement imposed by the rollers on the tires, thus rendering the present trackway 10 suitable for high speed expressway driving.

The location of the rollers 54 and the significance thereof from a kinematic standpoint may be viewed more clearly from FIGS. 4 and 5. Viewing FIG. 4, wherein tire 29 is shown in schematic form, as the tire rolls along surface 62 with pure rolling motion a point A on the periphery of the tire will pass through a path 63 generally semielliptical in configuration. The direction of the movement of particle A on wheel 29 will at any instant be tangential to the path 63. As is apparent point A has no directional movement when in the position shown in FIG. 4 and is therefore the instantaneous axis of rotation for the entire wheel 29.

Viewing FIG. 5 various velocity vectors for different particles on the tire 29 have been indicated, and it should be remembered again that the instantaneous axis of rotation A has no velocity with respect to the track or surface 62 since we have assumed pure rolling motion. It is readily apparent from FIG. 5 that the particles on the tire below the axis of rotation vary in their direction of movement up to one hundred eighty degrees. For example, particle B has a substantially upward vertical motion whereas particle C has substantially downward motion, while particle D has substantially horizontal motion.

The particles of the tire above the axis of rotation 40, however, have a much lesser angular deviation with respect to one another, and this deviation decreases as one moves radially away from the axis of rotation and also decreases as a function of the band width. Therefore, it is desirable that the rollers be positioned as far outward radially as possible, or as far upwardly away from surface 47, and also that the rollers have a small axial length as possible, i.e. axial with respect to axes 58. However, these requirements must be compromised somewhat to accommodate a roller position which will provide good contact with the side of the tire as well as providing a sufficient length for rollers to give good guiding action. Viewing FIG. 5, it can be seen that particle F on the left sde of the upper portion of the tire does not have a significant angular relationship with the direction of movement of particle G on the right side of the upper portion of the tire. Thus, it is apparent that all of the particles adjacent the upper portion of the tire have their major components of movement in the direction of movement of the vehicle itself, which corresponds with the velocity components of the peripheral surfaces of rollers 54. While there is some minor vertical component to these particles in the direction of the axes 58 of the rollers, the low coefficient of friction between the rollers and the tire do not render this a significant resistive force on the tire. The rollers 54 are illustrated schematically in FIG. 5 adjacent this band of substantially unidirectional tire particle movement.

What is claimed is:

1. A vehicular track and wheel combination, comprising: wheel means adapted to roll along a predetermined path and having an axis of rotation, and track means engaging the side of said wheel means, substantially all of said track means engaging the wheel means above the axis of rotation thereof.

2. A vehicular track as defined in claim 1 wherein said track means has a generally horizontally extending portion adapted to engage the periphery of said wheel means, the portion of said track means engaging the side of said wheel means including a plurality of rollers each mounted for rotation about a substantially vertical axis.

3. A vehicular track as defined in claim 2 wherein said wheel means includes an inflatable rubber tire, said rollers being disposed entirely above the axis of rotation of said wheel means.

References Cited

UNITED STATES PATENTS

| 1,795,247 | 3/1931  | Burns      | 256—13.1   |
| 1,969,845 | 8/1934  | Hick       | 104—247 UX |
| 3,102,627 | 9/1963  | Acton et al. | 198—29   |
| 3,218,991 | 11/1965 | Wehner     | 105—368 B  |

ARTHUR L. LA POINT, Primary Examiner

R. A. BERTSCH, Assistant Examiner

U.S. Cl. X.R.

94—1.5; 198—29; 256—13.1